(No Model.) 2 Sheets—Sheet 1.
O. H. BASQUIN.
DEVICE FOR SELECTING PRISMS HAVING PROPER ANGLES.
No. 595,261. Patented Dec. 7, 1897.
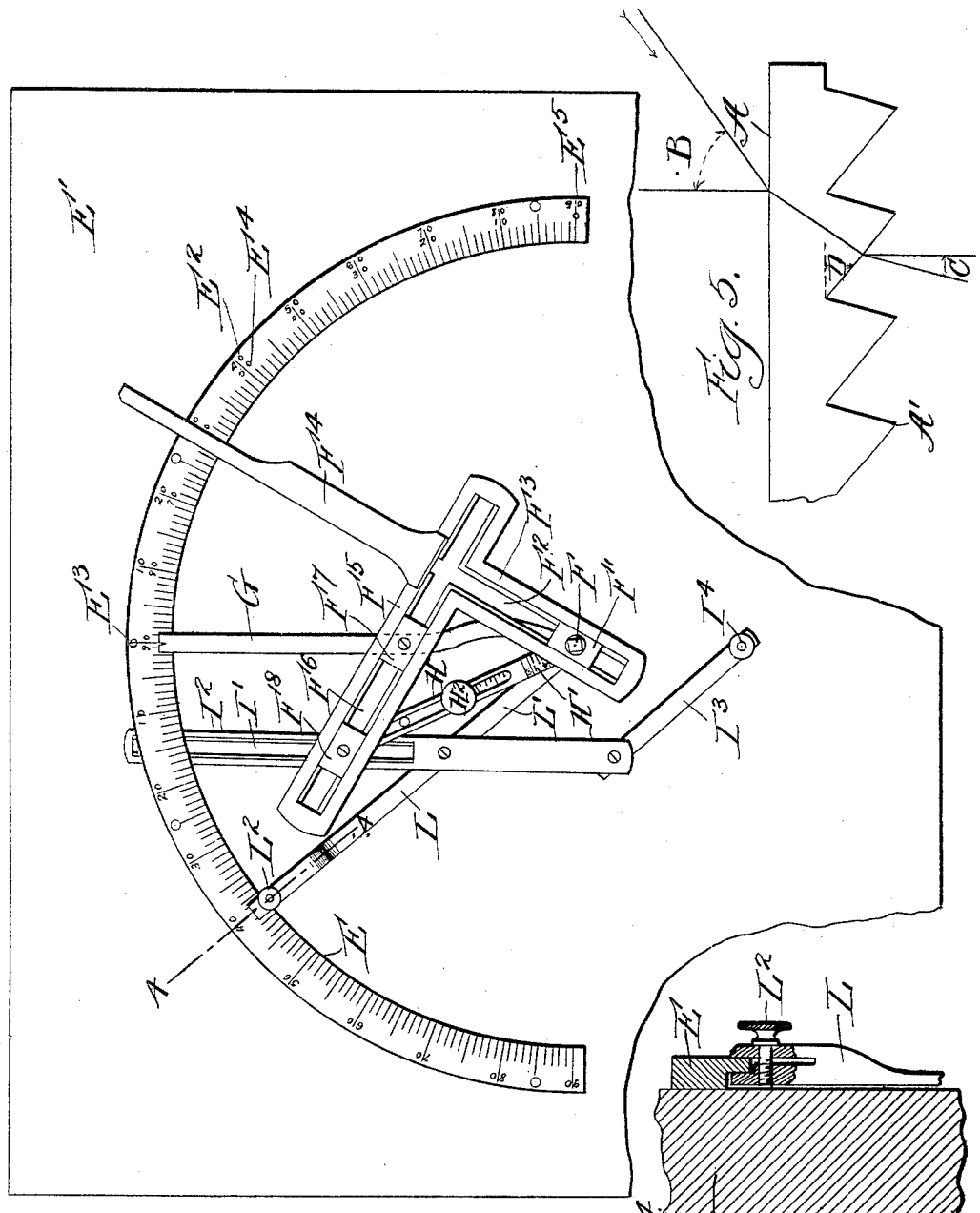

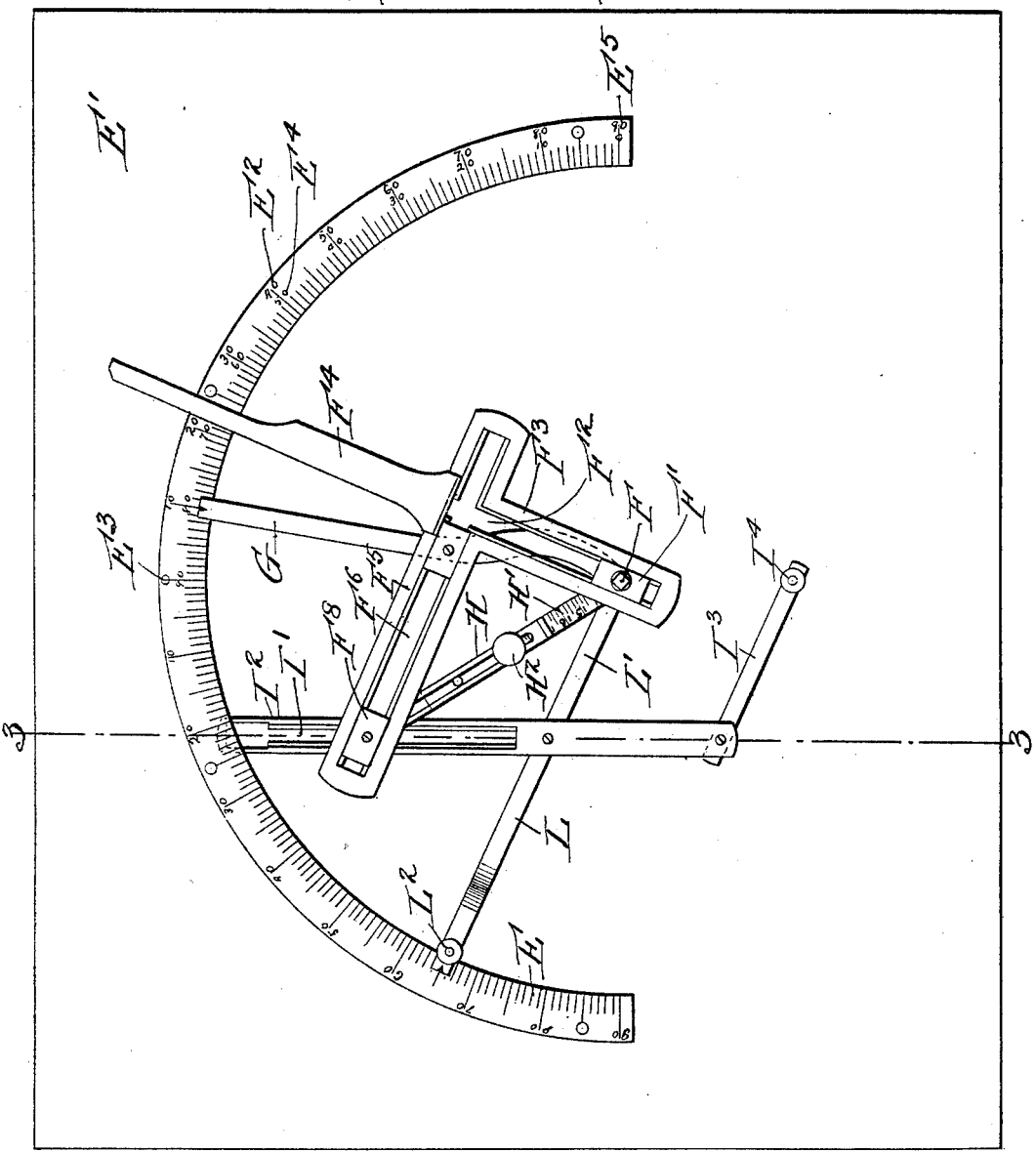

UNITED STATES PATENT OFFICE.

OLIN H. BASQUIN, OF CHICAGO, ILLINOIS, ASSIGNOR TO THE LUXFER PRISM PATENTS COMPANY, OF SAME PLACE.

DEVICE FOR SELECTING PRISMS HAVING PROPER ANGLES.

SPECIFICATION forming part of Letters Patent No. 595,261, dated December 7, 1897.

Application filed October 7, 1897. Serial No. 654,372. (No model.)

*To all whom it may concern:*

Be it known that I, OLIN H. BASQUIN, a citizen of the United States, residing at Chicago, in the county of Cook and State of Illinois, have invented certain new and useful Improvements in Prism - Finding Devices, of which the following is a specification.

My invention relates to devices for selecting the proper prisms to be used in a prism-plate under certain given conditions.

My invention is illustrated in the accompanying drawings, wherein—

Figure 1 is a plan view of a device embodying my invention. Fig. 2 is a view of Fig. 1 with the parts differently disposed. Fig. 3 is a section on line 3 3, Fig. 2. Fig. 4 is a section on line 4 4, Fig. 1. Fig. 5 shows a ray of light passing through a prism.

Like letters refer to like parts throughout the several figures.

When prisms are used in connection with windows, canopies, or the like to produce an increased illuminating effect in an apartment, for example, the angle of the prism will depend upon the direction in which it is desired to have the light leave the prism, the direction in which the light comes before entering the prism, and the index of refraction of the glass from which the prism is made. The object of my present invention is to provide a simple, reliable, and efficient device for finding this angle of the prism when these three factors are known.

I have shown a portion of a prism-light A, provided with the prisms A', and have indicated the various angles which I shall speak of in connection with my device. The angle at which the light enters the prism may be called the "angle of the incident ray," such angle being the angle B in the drawings. The angle at which the light leaves the prism may be called the "angle of the leaving ray," said angle being the angle C in the drawings. The angle of the prism which my present device indicates is the angle D of the drawings. In using this instrument the known quantities are the angle at which the light enters the prism—that is, the angle B—the angle at which the light leaves the prism—that is, the angle C—(both of these angles being the angles which the light makes with the horizontal, or a plane perpendicular to the receiving-face of the prism,) and the index of refraction of the glass. The index of refraction of course depends upon the glass itself and is readily found. The unknown quantity, which the present device is adapted to find, is the angle of the prism—namely, the angle D.

Referring now to Fig. 1, I provide a graduated scale E, which is mounted in any desired manner—as, for example, upon the support E'. As illustrated in the drawings, I have shown this scale as a graduated arc of one hundred and eighty degrees, the graduations being in degrees. This arc is provided with two scales, one, $E^2$, beginning at the center $E^3$ and running each way, as shown. This scale may be called the "light-scale." The other scale $E^4$ begins with zero at $E^5$, the ninety-degree mark being located at $E^2$. This scale may be called the "prism-scale."

I have constructed the device so that the same graduations may be used for both scales; but it is of course evident that different graduations might be used and that the parts might be arranged in a different manner. I have arranged the parts in the manner shown for the reason that this appears to be the most convenient arrangement obtainable. At the center of the graduated arc E, I provide a pin F or the like, carrying the block F', working in the slot $F^2$ in the arm $F^3$, connected with the prism-angle pointer or indicator $F^4$. A second arm $F^5$ is connected with the prism-angle indicator $F^4$ and is provided with the slot $F^6$. The slot $F^6$ and the slot $F^2$ are substantially at right angles to each other. A sliding block $F^7$ works in the slot $F^6$ and is connected with the pointer G, pivotally connected with the pin F and adapted to be moved along the graduated arc. This pointer G indicates the angle at which the ray of light leaves the prism. A second block $F^8$ also works in the slot $F^6$. This block is connected with the pointer H of the index of refraction-scale H', which is pivoted to the pin F. The pointer H and the scale H' slide with relation to each other and are held in any given position by means of the thumb-screw $H^2$. The block $F^8$ is connected with a block I, (see Fig. 3,) working in the slot I' in the guide $I^2$. This guide is pivoted to the arm $I^3$, which is in turn connected with the fixed pivot I⁴, preferably in line with the graduation E³ and the pin F. The guide I² is also pivotally connected with the pointer L, adapted to be moved along the graduated arc and pivotally connected with the pin F. The part L' of the pointer L is equal in length to the arm I³, and the parts are so arranged that the guide I² is parallel to itself in all its various positions, or, in other words, has a movement of translation. The arc E is cut away or formed so that the guide I² may move freely thereunder. The pointer L is preferably provided with means whereby it may be fastened in any desired position. This result may be obtained in any desired manner. As illustrated in the drawings, the pointer is split at the end, as shown in Fig. 4, the arc passing between the split portions. A thumb-screw L² engages these split portions and compresses them, so that they will grasp the arc, and thus be held in any desired position. I have shown the pointers G and L as working upon the same scale; but it is of course evident that separate scales might be used, if desired.

I have shown a particular construction embodying my invention and have described the parts in detail; but it is of course evident that the parts may be varied in form, construction, and arrangement without departing from the spirit of my invention, and I therefore do not wish to be limited to the construction shown.

In using the device as illustrated in the drawings I move the pointer H along the scale H' until it indicates the index of refraction of the glass. This scale H', as illustrated in the drawings, is divided into tenths. In Fig. 1 the pointer is set at "$1\tfrac{5}{10}$" and in Fig. 2 at "$1\tfrac{7}{10}$." The pointer is held in the desired position by tightening the thumb-screw H². The pointer L is then moved along the arc until it is opposite the graduation representing the angle at which the light enters the prism, and the thumb-screw L² is then tightened, so as to hold the pointer L in place. The pointer G is then moved opposite the graduation on the scale E, which represents the angle at which the light leaves the prism. The pointer F⁴ then indicates on the scale E⁴ the angle of the prism to be used—namely, the angle D. This angle is then readily and easily read from the scale.

In Fig. 1 I have set the instrument for a glass having an index of refraction of one and five-tenths, the light entering the prism at an angle of forty degrees and leaving the prism at an angle of zero—namely, in a horizontal direction. Under these conditions the pointer F⁴ shows that the angle of the prism is sixty degrees.

In Fig. 2 the index of refraction of the glass is one and seven-tenths, the light entering the prism at an angle of seventy-five degrees and leaving the prism at an angle of ten degrees above the horizontal. Under these conditions the pointer F⁴ indicates that the angle of the prism to be used is sixty-six degrees.

When the light is to leave the prism above the horizontal, the pointer G is moved to the right of the graduation E³, and when the light is to leave the prism below the horizontal said pointer is moved to the left of said graduation.

I claim—

1. A device for finding the angles of prisms, comprising an indicating device adapted to be set so as to indicate the index of refraction of the glass, a second indicating device adapted to be set so as to indicate the angle at which the light is received, a third indicating device adapted to be set so as to indicate the angle at which the light leaves the prism and a pointer associated with said indicating devices adapted, when the indicating devices are set, to indicate the angle of the prism to be used.

2. A device for finding the angles of prisms which will throw the light toward a given point when it is received from a given direction, comprising a series of indicating devices adapted to indicate upon suitable scales the conditions to be met, a pointer adapted to indicate upon a suitable scale the angle of the prism, said pointer provided with two slots substantially at right angles to each other and connected with said indicating devices by a series of sliding blocks working in said slots.

3. A prism-angle-indicating device provided with a series of indicating devices adapted to indicate the conditions to be met, said indicating devices comprising a pointer adapted to indicate upon a suitable scale the angle at which the light is received, a pointer adapted to indicate the angle of the prism, and a parallel-moving arm connecting said two pointers together.

4. A device for finding the angles of prisms, comprising a graduated arc, a series of indicating devices pivotally connected at the center about which the arc is described, a pointer adapted to point out the angle of the prism to be used on said graduated arc and connected with the center about which the arc is described, said pointer connected with said indicating devices so as to be controlled thereby.

5. A device for finding the angles of prisms, comprising a graduated arc divided into degrees, a pointer connected with the center about which said arc is described and adapted to be moved along said arc to indicate the angle at which the light is received, a second pointer pivotally connected with the center about which said arc is described and adapted to indicate on the arc the angle at which the light leaves the prism, a pointer connected with both of said pointers and adapted to indicate on a suitable scale the index of refraction of the glass of which the prism is made, and an indicator connected with said pointers and adapted to move along said arc and indicate the angle of the prism when the pointers are set for given conditions.

6. A device for measuring the angles of prisms, comprising a graduated arc, two pointers or indicators pivotally connected with the center about which said arc is described and adapted to move along a common scale, one of said pointers adapted to indicate the angle at which the light is received and the other the angle at which it leaves the prism, a device for indicating the index of refraction of the glass connected with said pointers and an indicator for indicating the angle of the prism when said pointers are set.

OLIN H. BASQUIN.

Witnesses:
DONALD M. CARTER,
HOMER L. KRAFT.